United States Patent [19]

Richardson et al.

[11] 4,289,633

[45] Sep. 15, 1981

[54] CHEMICAL PROCESS FOR BACKSURGING FLUID THROUGH WELL CASING PERFORATIONS

[75] Inventors: Edwin A. Richardson, Houston; Ronald F. Scheuerman, Bellaire; David C. Berkshire, Houston, all of Tex.

[73] Assignee: Shell Oil Company, Houston, Tex.

[21] Appl. No.: 105,815

[22] Filed: Dec. 20, 1979

Related U.S. Application Data

[62] Division of Ser. No. 28,025, Apr. 6, 1979, Pat. No. 4,219,083.

[51] Int. Cl.$^3$ ............................................. E21B 43/25
[52] U.S. Cl. ........................... 252/8.55 B; 252/8.55 R; 252/186; 252/187 H
[58] Field of Search ................. 166/300, 312, 311; 252/8.55 B, 8.55 C, 8.55 R, 187 H

[56] References Cited

U.S. PATENT DOCUMENTS

| | | | |
|---|---|---|---|
| 3,215,199 | 11/1965 | Dilgren | 166/307 X |
| 3,767,586 | 10/1973 | Rutkiewic et al. | 252/187 H |
| 3,828,854 | 8/1974 | Templeton et al. | 166/307 |
| 3,868,998 | 3/1975 | Lybarger et al. | 166/308 X |
| 4,178,993 | 12/1979 | Richardson et al. | 166/300 |

*Primary Examiner*—Herbert B. Guynn

[57] ABSTRACT

A backsurge of fluid through perforations in a well casing is chemically induced by injecting into the surrounding reservoir a solution which contains (a) nitrogen gas-generating reactants, (b) a reaction-retarding alkaline buffer, and (c) a pH-reducing reactant that is capable of subsequently overriding the buffer, so that a rapid production of gas and heat causes a backsurging of fluid into the wellbore.

3 Claims, 2 Drawing Figures

CHEMICAL PROCESS FOR BACKSURGING FLUID THROUGH WELL CASING PERFORATIONS

RELATED APPLICATION

This is a division of application Ser. No. 028,025, filed Apr. 6, 1979, now U.S. Pat. No. 4,219,083.

BACKGROUND OF THE INVENTION

It is often desirable to backsurge fluid through the well casing perforations and perforation tunnels which interconnect a well with the surrounding reservoir. This tends to flush out any perforation gun debris or other solid particles that might impede the flow of fluid.

As indicated by the McCauley, Barnes and Suman U.S. Pat. No. 3,743,021, in many wells, such as backsurging can be mechanically induced by a rapid intake of fluid into low pressure chambers positioned within the casing. But, in relatively shallow wells, or wells in pressure-depleted reservoirs, a mechanically-induced backsurging may be difficult or undesirable. The lack of pressure differential into the wellbore may make it hard to arrange a low pressure chamber capable of providing enough pressure drop to effectively backflush the perforations.

A copending patent application by E. A. Richardson and R. F. Scheuerman, Ser. No. 902,636, filed May 4, 1978, now U.S. Pat. No. 4,178,993, describes a process for initiating a generation of a controlled amount of nitrogen gas within a wellbore and/or an adjacent reservoir. The gas-generating process is used to initiate a production of fluid from a well from which the production is impeded by the hydrostatic pressure of the liquid in the wellbore. In the process of the Ser. No. 902,636 application, the gas-generating liquid contains both a compound that can be oxidized to yield nitrogen gas and an oxidizing agent capable of effecting the oxidation. The composition of the gas-generating liquid is correlated with the pressure, temperature and volume properties of the reservoir and well conduits so that the pressure and volume of the generated gas causes liquid to be displaced from the wellbore. Enough liquid is displaced to reduce the hydrostatic pressure to less than the fluid pressure in the adjacent portion of the reservoir and cause fluid to flow from the reservoir. The disclosures of the Ser. No. 902,636 application are incorporated herein by cross-reference.

We have now discovered that (a) the gas-generating reaction process of the Ser. No. 902,636 application can operate in the presence of both a reaction-delaying buffer and a buffer-overriding reactant, (b) the so-modified solution can be injected through a wellbore and into a reservoir to there provide a very fast-rising pulse of both fluid pressure and heat within a rear-well portion of the reservoir, and (c) such a provision of such a pulse can initiate a perforation-cleaning backsurge of fluid through the perforations in a well casing.

SUMMARY OF THE INVENTION

The present invention relates to a chemical process for initiating a backsurging of fluid through well casing perforations and perforation tunnels that interconnect a wellbore with a subterranean reservoir. A chemically delayed gas-generating aqueous liquid solution is injected through the well conduits, perforations and perforation tunnels and into the reservoir. The injected solution contains (a) at least one compound which has at least one nitrogen atom to which at least one hydrogen atom is attached and is capable of being rapidly and exothermically oxidized within an acidic aqueous solution to yield heat, nitrogen gas and liquid or dissolved byproducts that are substantially inert to well conduits and reservoir components, (b) at least one oxidizing agent which is capable of so-oxidizing the nitrogen-containing compound, (c) an alkaline buffer system that is capable of maintaining the pH of the solution at a value above about 7 at which the rate of the gas-generating reaction is relatively slow, and (d) a pH-reducing reactant which is capable of subsequently overriding the buffer and lowering the pH of the solution to a value below about 7 at which the rate of the gas-generating reaction is relatively fast. The composition of the injected solution is correlated with the pressure and temperature of the reservoir and the rate at which fluid can be injected into the reservoir so that (a) the buffer-reduced rate of the gas-generating reaction and the rate of the buffer-overriding pH-reducing reaction are slow enough to permit a significant volume of the gas-generating solution to the injected into the reservoir before the rate of the gas-generating reaction becomes relatively fast and (b) the kinds and proportions of the nitrogen-containing compound and oxidizing agent are such that a significant volume enters the reservoir at least substantially as soon as the buffer is overridden. Then, the well is arranged to permit a production of fluid.

DESCRIPTION OF THE INVENTION

Figure 1:
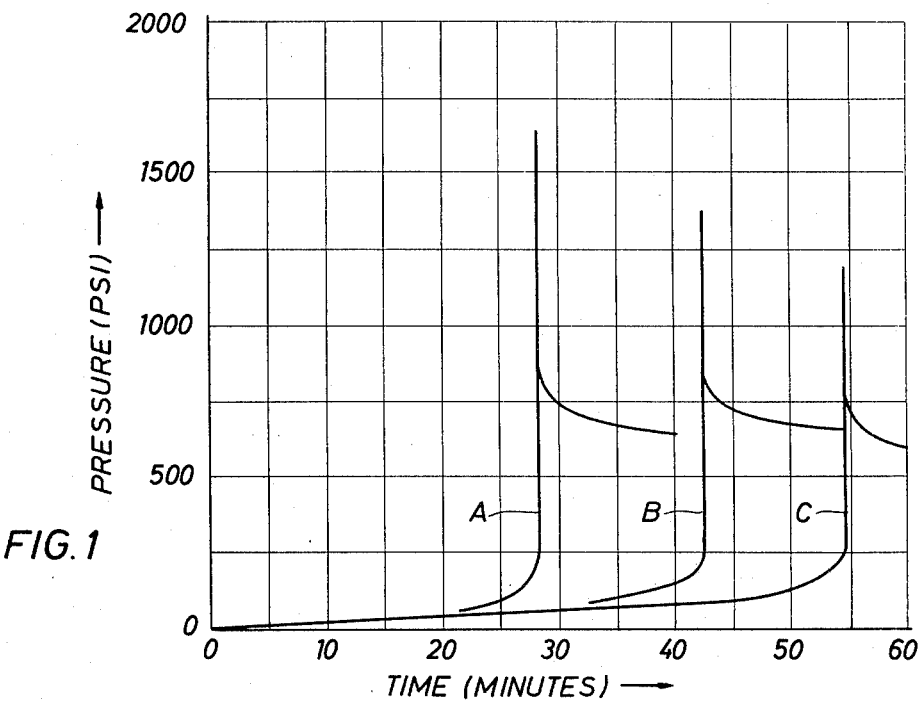
FIG. 1 shows a plot of the pressure with time of the gas generated by a series of reacting solutions.

This invention is, at least in part, premised on a discovery that, at least with respect to typical shallow and/or pressure-depleted reservoirs, (1) the nitrogen-gas-generating reactants of the Ser. No. 902,636 application can be prevented from reacting for a long enough time to allow a significant volume of the reactant-containing solution to be injected through debris-impaired well casing perforations and/or perforation tunnels and into a reservoir, and (2) the so-delayed reactants can be caused to subsequently react fast enough to produce a fast rising pulse of fluid pressure and heat that is capable of causing a debris-removing rate and extent of a backflushing of fluid through the perforation tunnels.

As disclosed in application Ser. No. 902,636, laboratory tests have demonstrated that the rate of gas-generating reaction can be drastically reduced by including an alkaline buffer within such a solution of reactants. And, we have now found that, when a pH-reducing reactant is included in such a buffer-delayed solution and allowed to override the buffer, the rate of the gas-generating increases with both the increase in acidity and temperature, so that the reaction can, in effect, "run-away" and generate a fast-rising pulse of heat and pressure.

In general, the amount of gas and heat that can be generated are controlled by the kind and amount of nitrogen-containing compound and oxidizing agent.

The rate of the reaction is, additionally, responsive to the temperature and pH of the solution.

Even where the permeability of a reservoir is so high that fluid pressures are relatively rapidly dissipated (by displacing of fluids within the reservoir), a relatively large volume of relatively highly-concentrated gas-generating reactants and pH-reducing reactants can be used and can generate pressure gradients across well casing perforations that are high enough to cause significantly large and fast backsurges of fluid (before enough fluid is displaced away from the well to normalize the pressure within the reservoir). Where the reservoir permeability is relatively low, a relatively lower concentration of gas-forming reactants and/or more slowly-reactive or less concentrated pH-reducing reactant can be used in order to avoid the generation of a pressure high enough to fracture the reservoir. In general, it is desirable to inject the reactant-containing solution relatively slowly in order to avoid fracturing the reservoir and/or the casing-surrounding cement or the bonds between the cement and the reservoir. Threfore, it is generally desirable to adjust the initial pH of the solution of reactants to a relatively high value and/or to incorporate a large enough proportion of alkaline buffer and/or alkaline material. Such procedures can insure that the reaction rate will remain low during a slow injection of the solution.

Because of its versatility, the present process is often more advantageous than a mechanically induced back-surging treatment for cleaning well casing perforations. For example, it can be used where the well depth and/or reservoir pressure is inadequate for the provision of a low pressure chamber of sufficient volume to cause an inflow pressure gradient that induces an adequate rate and extent of backsurge. With the present process, an adequate inflow pressure gradient can be chemically induced by generating a localized pulse of pressure and heat in the portion of the reservoir immediately adjacent to the well. And, where the viscosity of the reservoir oil tends to reduce the flow rate of a mechanically induced backsurge, such a flow rate can be increased by the heating and thermal mobilizng effect of the present chemically induced backsurging.

In conducting the present process, where desirable, the well conduits above the depth of the reservoir can be freed of at least some of the liquid they contain by means of the process of the 902,636 application. In such a procedure the delayed gas-producing reactant solution of the present invention (which contains both the reaction-delaying buffer and the buffer-overriding material) can be spotted within the well conduits ahead of a substantially immediately-reactive solution of the Ser. No. 902,636 application so that gas is generated at a selected rate within the well conduits. After both solutions have entered the well conduits, the well can be shut in or operated so that at least some of the delayed-reaction solution is displaced into the reservoir by the gas being generated within the well conduits. Then, before or soon after the generation of the pressure pulse provided by the present delayed gas-producing solution within the reservoir, the well can be opened to allow an outflow of gas that causes a prompt reduction of the pressure within the well. In that way, the pressure in the well can be reduced to substantially atmospheric pressure.

SUITABLE COMPOSITIONS

Suitable nitrogen-containing gas-forming reactants for use in the present process can comprise water-soluble amino nitrogen-containing compounds which contain at least one nitrogen atom to which at least one hydrogen atom is attached and are capable of reacting with an oxidizing agent to yield nitrogen gas within an aqueous medium. Such water-soluble nitrogen-containing compounds can include ammonium salts of organic or inorganic acids, amines, amides, and/or nitrogen-linked hydrocarbon-radical substituted homologs of such compounds, as long as they react with an oxidizing agent to produce nitrogen gas and byproducts which are liquid or dissolve in water to form liquids which are substantially inert relative to the well conduits and reservoir formation. Examples of such nitrogen-containing compounds include ammonium chloride, ammonium nitrate, ammonium nitrite, ammonium acetate, ammonium formate, ethylene diamine, formamide, acetamide, urea, benzyl urea, butyl urea, hydrazine, phenylhydrazine, phenylhydrazine hydrochloride, and the like. Such ammonium salts, e.g., ammonium chloride, ammonium formate or ammonium nitrate are particularly suitable.

Oxidizing agents suitable for use in the present process can comprise substantially any water-soluble oxidizing agents capable of reacting with a water-soluble nitrogen-containing compound of the type described above to produce nitrogen gas and the indicated types of by-products. Examples of such oxidizing agents include alkali metal hypochlorites (which can, of course, be formed by injecting chlorine gas into a stream of alkaline liquid being injected into the well), alkali metal or ammonium salts of nitrous acid such as sodium or potassium or ammonium nitrite, and the like. The alkali metal or ammonium nitrites are particularly suitable for use with nitrogen-containing compounds such as the ammonium salts. Since the reaction can occur between ammonium ions and nitrite ions, ammonium nitrite is uniquely capable of providing both the nitrogen-containing and oxidizing reactants in a single compound that is very soluble in water.

Aqueous liquids suitable for use in the present invention can comprise substantially any in which the salt content does not (e.g. by a common ion effect) prevent the dissolving of the desired proportions of N-containing and oxidizing reactants. In general, any relatively soft fresh water or brine can be used. Such aqueous liquid solutions preferably have a dissolved salt content of less than about 1000 ppm monovalent salts and less than about 100 ppm multivalent salts.

Alkaline buffer compounds or systems suitable for initially retarding the rate of gas generation can comprise substantially any water-soluble buffer which is compatible with the gas-forming components and their products and tends to maintain the pH of an aqueous solution at a value of at least about 7. Examples of suitable buffering materials include the alkali metal and ammonium salts of acids such as carbonic, formic, acetic, citric, and the like, acids.

Reactants for reducing the pH of the aqueous solution and overriding the buffer can comprise substantially any water-soluble, relatively easily hydrolyzable materials which are compatible with the gas-forming reactants and their products and are capable of releasing hydrogen ions at a rate slow enough to allow the buffered solution of the gas-generating reactants to be injected into the reservoir formation before the pH is reduced to a value less than about 7. Examples of suitable reactants include: lower alcohol esters of the lower fatty acids such as the methyl and ethyl acetates, formates and the like; hydrolyzable acyl halides, such as benzoyl chloride; relatively slowly hydrolyzable acid anhydrides; relatively slowly hydrolyzable phosphoric or sulfonic acid esters; and the like.

HYPOTHETICAL WELL TREATMENT

The present process may be employed in completing a well drilled into a subterranean reservoir having the following characteristics. The reservoir is about 2,000 feet deep and 20 feet thick. It has a porosity of about 0.25 and an absolute permeability of about 100 millidarcies. The reservoir fluid pressure is about hydrostatic and the oil has a moderately high viscosity of about 2 centipoises at the temperature of about 105° F. existing within the reservoir.

The well casing is installed, cemented and cleaned by means of conventional equipment and techniques. A perforating operation is performed (with a clean solids-free fluid spotted across the reservoir interval) to provide, e.g., four perforations per foot. A tubing string is installed in a conventional manner. And, the borehole is drilled and arranged so that solid particles can settle into a "rat hole" below the level of the perforated interval or so that such particles can be washed out by circulating fluid within the well.

About 200 barrels (i.e., about one per foot) of a gas-generating aqueous treating solution is compounded so that it contains: about 4 moles per liter of each of ammonium chloride and sodium nitrite, about 0.1 mole per liter of an alkaline buffer consisting essentially of sodium bicarbonate, and about 1.0 mole per liter of a pH-reducing reactant consisting essentially of methyl formate. The kind and amount of those reactants are such that, while the solution temperature rises from a surface temperature such as 70° F. to the reservoir temperature of about 105° F., the solution will generate only a moderate amount of gas, e.g., about 25% of the stoichiometric amount.

Substantially as soon as the gas-generating solution is compounded it is displaced through the well conduits, casing perforations and perforation tunnels and into the reservoir. The solution is displaced ahead of a relatively light fluid such as a sodium chloride brine or an ammonium chloride brine having a pH adjusted to at least about 7. The solution is injected at a relatively slow rate (such as not more than about 10 gallons per minute) which is sufficient to displace substantially all of the gas-generating solution into the reservoir within about 1½ hours. The well is then opened to allow a production of fluid from the reservoir and wellbore. The production backflushes and cleans the perforations and perforation tunnels which interconnect the borehole and the reservoir.

It is generally desirable to use nitrogen-containing compounds and oxidizing agents which are dissolved in substantially stoichiometric proportions and in relatively high concentrations within the gas-generating solution. Such reactants are typified by ammonium chloride and sodium nitrite and they are preferably used in substantially equimolar amounts of from about 3 to 6 moles per liter.

The rate at which an aqueous liquid can be injected through the perforation tunnels and into the reservoir in response to pressures less than those which are apt to fracture the reservoir or damage the well conduits can be determined by injecting a clean aqueous liquid that will not cause any reservoir impairment (such as a clear monovalent salt solution or a fresh water, if the reservoir is free of swelling clays). The length of time for which the rapid generation of gas and heat is delayed should be at least sufficient to allow the selected amount of gas-generating solution to be injected at such a rate before the reaction-delaying buffer is overridden and the rapid gas production is initiated. Even in reservoirs capable of accepting the gas-generating solution at higher rates, it is preferable to limit the injection rate to a relatively low rate, such as about 0.25 barrel or less per minute, while providing a delay time sufficient to allow an injection of enough treating solution to substantially fill the pores within a zone around the well having a diameter of at least about one foot and preferably several feet. The slow rate of injection is advantageous in both: avoiding the disruption of poorly consolidated reservoir sands; and maximizing the vertical distribution of fluid, from behind the most permeable perforations to behind those which are more completely plugged.

As will be apparent to those skilled in the art, the duration of the delay time of the present delayed gas-generating solutions can be increased by either increasing the amount of the alkaline buffer that must be overridden and/or by increasing the initial pH of the solution which must be lowered to a value of less than about 7. The initial pH of the gas-generating solution can be increased by adding water-soluble alkaline compounds such as the alkali metal or ammonium carbonates, hydroxides, or the like. Where the gas-generating solution contains significant proportions of alkaline buffer and/or alkaline material to be acidified, the concentration of the pH-lowering reactant should be at least significantly greater than stoichiometric with respect to the amount of alkaline material. The need for this requires a pH-lowering reactant which is relatively highly water-soluble in order to be able to dissolve a sufficient proportion within the gas-generating solution.

In general, the advantage of the present process relative to a mechanically induced backsurging of well casing perforations increases with decreases in the reservoir depth and/or pressure. The present process is particularly advantageous where a mechanically induced backsurging is relatively undesirable because of a lack of reservoir depth or pressure.

LABORATORY TESTING

A number of tests of the capabilities of various solutions to generate gas and heat were conducted under conditions simulating those encountered within a subterranean reservoir formation. In such tests, the reactants were dissolved in an amount of aqueous liquid filling about one-fourth of the volume of a pressure resistant chamber or bomb. The bomb was maintained at a constant temperature within a circulating bath of liquid and measurements were made of the variations in gas pressure with time. The data obtained from typical tests in which the gas-producing reactants were ammonium chloride and sodium nitrite are listed in Table 1.

TABLE 1

REACTION PARAMETERS FOR $NH_{4+} + NO_{2-}$ REACTION

| Test No. | Composition, Moles/Liter | | | Bath Temp. °F. | pH at 70° F. when prepared | Maximum Pressure Attained psi | $t_{\frac{1}{2}}$ Minutes |
|---|---|---|---|---|---|---|---|
| | NH₄Cl | NaNO₂ | Other Components* | | | | |
| 1 | 1.0 | 1.0 | .2 NaAc + .2 HAc | 72.5 | 4.50 | 204 | 590 |
| 2 | 1.0 | 1.0 | .2 NaAc + .2 HAc | 113 | 4.50 | 317 | 61 |
| 3 | 2.0 | 1.0 | .2 NaAc + .2 HAc | 113 | 4.47 | 344 | 24 |
| 4 | 1.0 | 1.0 | 1 Methyl Formate | 122 | 6.42 | 380 | 49 |
| 5 | 2.0 | 2.0 | .2 NaHCO NaHCO + .1 MeFor | 210 | 7.12 | 865 | 76 |
| 6 | 3.0 | 2.0 | .2 NaHCO | 210 | 6.80 | 917 | 85 |
| 7 | 2.0 | 2.0 | .2 NaHCO | 210 | 8.54 | 650 | 681 |
| 8 | 2.0 | 2.0 | .2 NaHCO + .3 NaOH + .4 MeFor | 210 | 8.70 | 865 | 72 |
| 9 | 2.0 | 2.0 | .2 NaHCO + .3 NaOH + .2 MeFor + .2 MeAc | 210 | 8.65 | 850 | 178 |
| 10 | 2.0 | 2.0 | .2 Na HPO + .17 HCl | 210 | 6.50 | 870 | 31 |
| 11 | 2.0 | 2.0 | .2 NaHCO + .225 NaOH .245 MeFor | 210 | 8.18 | 795 | 146 |
| 12 | 4.0 | 4.0 | | 130 | 6.17 | 757 | 500 |
| 13 | 4.0 | 4.0 | .15 NaHCO | 210 | 6.92 | 248 | 115 |
| 14 | 3.0 | 3.0 | .05 NaHCO | 160 | 6.70 | 275 | 981 |
| 15 | 3.0 | 3.0 | .02 NaHCO | 160 | 6.56 | 250 | 636 |
| 16 | 2.25 | 3.0 | 1 NH Ac | 160 | 6.87 | 371 | 188 |
| 17 | 4.0 | 4.0 | .05 NaHCO | 160 | 6.66 | 360 | 660 |
| 18 | 4.0 | 4.0 | .05 NaHCO + .05 MeFor | 160 | 6.68 | 520 | 86 |
| 19 | 3.0 | 3.0 | .5 NaAc | 135 | | | 559 |

*NaAc = Sodium Acetate
HAc = Acetic Acid
MeFor = Methyl Formate
**$t_{\frac{1}{2}}$ = Half-life, i.e, the time by which the reactants have produced one-half of the stoichiometrically available $N_2$ gas.

The nitrogen gas-generating reaction of ammonium ions and nitrite ions is known to involve a side reaction which generates hydroxyl ions and increases the pH of the solution. The pH increase caused by the side reaction tends to terminate the generation of nitrogen gas before all of the potential amount has been formed. As is mentioned in the Ser. No. 902,636 application, such an alkaline pH drift can be avoided by including an alkaline buffer material to maintain a relatively slow and constant rate of reaction.

It has now been discovered that it is possible to include both a buffering material and acid-forming material so that hydrogen ions would be released at about the same rate at which the hydroxyl ions are released. The fact that this does not interfere with the gas generation reaction is indicated by the tendency for it to hold the pH constant and allow that reaction to proceed as a second order reaction.

In tests 7, 8 and 9, sodium bicarbonate was used as an alkaline buffer which was capable of providing a relatively slow rate of reaction at a temperature of 210° F. Test 7 shows that, with that buffer by itself, the half-life was 681 minutes. Test 8 shows that the addition of sodium hydroxide and methyl formate reduced the half-life to 72 minutes, because the rate and time of the hydrolysis of the methyl formate at this temperature is too fast and too short for the hydrogen ion generation to be effective throughout the reaction. Test 9 shows that a mixture of the bicarbonate, sodium hydroxide, methyl formate and methyl acetate provided a half-life of 178 minutes. The tests thus indicate that the slower hydrolysis of the methyl acetate continues the hydrogen ion-releasing after the exhaustion of the methyl formate, so that the pH is kept substantially constant. The data fits second order kinetics during about 80% of the generation of the nitrogen gas. And, it is thus apparent that the gas-generating reaction can be significantly delayed for a time and then allowed to proceed; by adding both a buffering material and an acid-generating material.

One effect of the present type of nitrogen gas-generation is a large heat of reaction. For example, for the reaction between ammonium ions and nitrite ions, the heat of reaction is 70,000 calories per mole. Such an effect makes the half-lives of less than about 100 minutes difficult to measure at a selected temperature. For short half life runs, the temperature rises well above the bath temperature and then falls back as a reaction exhausts itself. This is due primarily to the relatively rapid transferring of heat through the bomb walls to the liquid circulating within the bath.

Calculations indicate that, with respect to relatively short half-life gas-generation systems, which are reacting within the tubing string of a well, the heat is transferred rapidly enough to limit the temperature rise. However, when such a system is disposed within a subterranean reservoir formation, the temperature can rise to a much higher level. And, (since the rise in temperature can increase the rate of reaction) within a reservoir formation, the reaction can "run away" and generates a very rapidly rising pulse of gas and heat.

Caution should be exercised in storing large volumes of such gas-generating solutions in surface locations, in order to avoid any self-heating and accelerating of the reaction. Catalysts such as acids, dichromates or other oxidizing agents should be prevented from accidentally contacting such a solution. However, mixing such solutions immediately before their use should be sufficient to avoid such difficulties. A large cooling effects occurs during the dissolving of the salts and, in general, such solutions would be cooled (e.g., to temperatures of about 40 degrees or less) during the mixing operation.

FIG. 1 shows the pressure versus time behavior that occurs during the above described types of laboratory tests of systems containing four moles each of sodium nitrite and ammonium chloride, one-tenth mole of sodium bicarbonate and varying amounts of methyl formate. Curve A shows the performance of a solution containing one mole of methyl formate. During about the first 25 minutes the reaction proceeded relatively slowly while the buffer was keeping the pH high and was gradually being overcome (by the releasing of hydrogen ions; which were being released by the methyl formate at a faster rate than hydroxyl ions were released by the side reaction). After about 27 minutes, the bicarbonate buffer was exhausted. The reaction then ran-away, since the heat was then produced much faster than it could be transferred through the bomb wall to the circulating bath liquid. The combination of volume and temperature of the gas resulted in a rapidly rising pressure pulse (of about 1600 psi).

Curve B shows the effect of using only 0.5 mole of methyl formate. That smaller proportion of acid-yielding reactant resulted in a slower rate of overriding the buffer. And, because more heat was dissipated while the reaction rate was slow, a lower pulse of pressure was produced when the rate was accelerated. Curve C shows the similar effects of reducing the methyl formate concentration to 0.3 mole.

Figure 2:
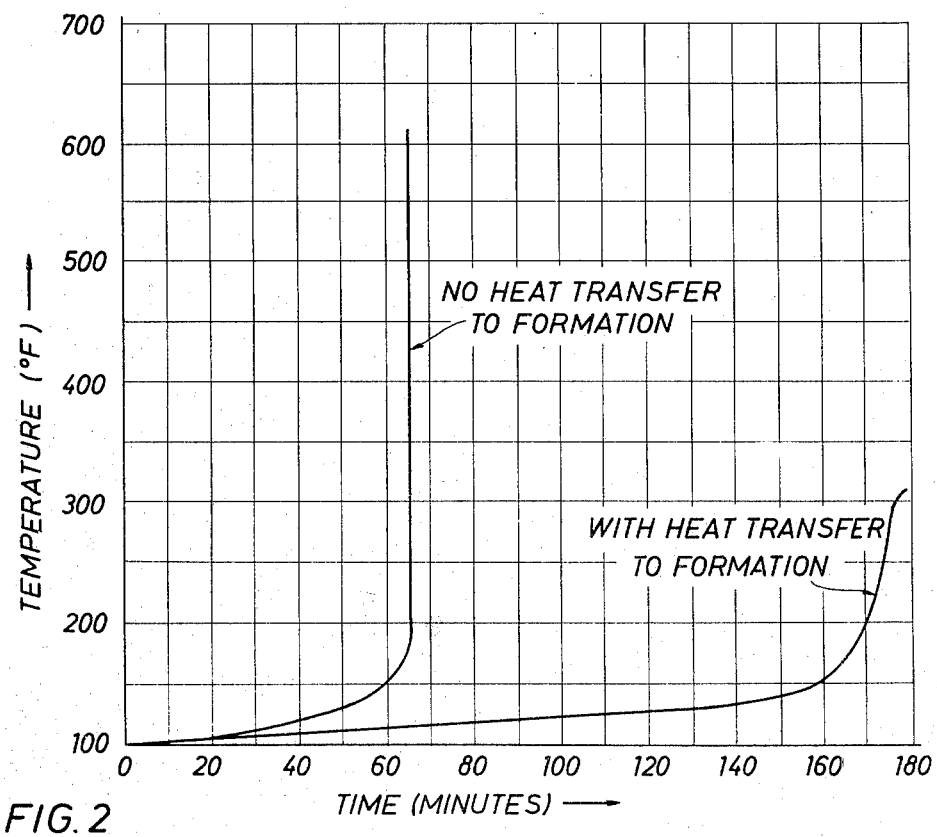
FIG. 2 shows a plot of calculated increases in temperature with time during a generation of nitrogen gas and heat within a reservoir formation.

FIG. 2 shows the results of calculations (from the reaction kinetics and the heat capacities of a sandstone reservoir) with respect to the amount of heat imparted to an aqueous liquid contained within the pores of a reservoir formation. In each case the data relates to a reaction between four moles per liter of ammonium chloride and four moles per liter of sodium nitrite. The first curve (from the left) shows that, where no heat is transferred to the reservoir formation, the liquid would be heated to a temperature of about 600° F. The second curve shows that even where heat is transmitted into the rock solids (at the heat transfer rate of silica) the liquid would be heated to more than 300° F. Of course, in a reservoir formation the actual results would fall somewhere between those extremes. Some, but not much, heat would be transferred into the rock and/or into droplets of any bypassed reservoir oil that remained without the treated zone. However, it is believed to be apparent that such reactions may provide a very significant heating and thermal mobilization of the bypassed oil and such an oil-mobilization may provide a significant increase in the rate of flow of the backsurge due to a given pressure gradient.

What is claimed is:

1. An additive that dissolves in an aqueous liquid to form a solution capable of treating a well within a subterranean reservoir by chemically generating a pulse of fluid pressure and heat within a near-well portion of the reservoir, comprising:

at least one water-soluble salt of ammonium hydroxide capable of being oxidized within an acidic aqueous solution to yield nitrogen gas and liquid or dissolved by-products which are substantially inert to the components of said well and reservoir;

at least one water-soluble salt of nitrous acid that is an oxidizing agent capable of so-oxidizing salt of ammonium hydroxide and is present in at least a substantially stoichiometric proportion for said nitrogen gas production from said salt of ammonium hydroxide.

at least one water-soluble alkaline buffer system which is capable of maintaining an aqueous solution containing said nitrogen-containing compound and said oxidizing agent at a pH of at least 7 at which the rate of said gas-generating reaction is relatively slow throughout a period in which a significant proportion of hydrogen ions are being released within the solution; and, at least one water-soluble compound which is (a) capable of being dissolved in an aqueous solution containing said salts of ammonium hydroxide and nitrous acid and alkaline buffer and there reacting to yield enough hydrogen ions to subsequently reduce the pH of the solution to a pH less than about 7 at which the rate of said gas-generating reaction is relatively fast, (b) is capable of causing said pH reduction to occur after a time sufficient to permit a significant volume of the solution to be injected through the said well and into the surrounding reservoir and (c) is a member of the group consisting of lower alcohol esters of lower fatty acids, hydrolyzable acyl halides, relatively slowly hydrolyzable acid anhydrides and relatively slowly hydrolyzable phosphoric or sulfonic acid esters.

2. The additive of claim 1 in which the kinds and amounts of said components are arranged to function as specified when a significant volume of said relatively slowly reacting solution is injected into said reservoir at a rate of not more than about 0.25 barrel per minute.

3. The additive of claim 1 or 2 in which (a) said well is cased and perforated adjacent to a reservoir in which the pressure depth is too small to provide an effective mechanically induced backsurging of fluid through the perforations, (b) said well treatment is a chemically induced backsurge of fluid through said perforations and (c) the kinds and amounts of said aqueous solution components are correlated with respect to the temperature and injectivity properties of that reservoir.

* * * * *